United States Patent
Yatabe et al.

(10) Patent No.: US 6,524,008 B1
(45) Date of Patent: Feb. 25, 2003

(54) BALL BEARING

(75) Inventors: Takayuki Yatabe, Kanagawa (JP);
Hisato Yamamoto, Kanagawa (JP);
Yasuhisa Terada, Kanagawa (JP);
Takashi Ogawa, Kanagawa (JP);
Tsuyoshi Koshi, Kanagawa (JP);
Hiroya Achiha, Kanagawa (JP); Shoji Noguchi, Kanagawa (JP)

(73) Assignee: NSK, Ltd., Tokyo (JP)

( * ) Notice: Subject to any disclaimer, the term of this patent is extended or adjusted under 35 U.S.C. 154(b) by 0 days.

(21) Appl. No.: 09/619,503

(22) Filed: Jul. 19, 2000

(30) Foreign Application Priority Data

Jul. 19, 1999 (JP) .............................. 11-205245
Jan. 17, 2000 (JP) ....................... 2000-007930

(51) Int. Cl.[7] ...................... F16C 19/00; F16C 33/58
(52) U.S. Cl. .................. 384/450; 384/513; 384/516
(58) Field of Search ................ 384/513, 516, 384/450, 490

(56) References Cited

U.S. PATENT DOCUMENTS

| | | | | |
|---|---|---|---|---|
| 3,292,980 A | | 12/1966 | Gustafsson et al. | |
| 4,343,521 A | * | 8/1982 | Akabane et al. | 384/516 |
| 5,560,715 A | * | 10/1996 | Mosby | 384/484 |
| 6,082,906 A | * | 7/2000 | Satou et al. | 384/516 |
| 6,102,575 A | * | 8/2000 | Obara | 384/480 |
| 6,116,786 A | * | 9/2000 | Takata et al. | 384/516 |
| 6,142,674 A | * | 11/2000 | Bayer | 384/513 |
| 6,152,605 A | * | 11/2000 | Takemura et al. | 384/516 |
| 6,267,510 B1 | * | 7/2001 | Herber et al. | 384/450 |

FOREIGN PATENT DOCUMENTS

| | | | |
|---|---|---|---|
| DE | 1169210 | 7/1956 | |
| EP | 0528193 A2 | 2/1993 | F16C/33/60 |

* cited by examiner

*Primary Examiner*—Jack Lavinder
*Assistant Examiner*—Robert A. Siconolfi
(74) *Attorney, Agent, or Firm*—Sughrue Mion, PLLC

(57) ABSTRACT

An outer ring 3a is formed so as to have a large thickness and the pitch circle diameters Dp of balls 6 are shifted to the inside diameter side of the present ball bearing. The radiuses of curvature Ro, Ri of the section shapes of an outer ring raceway 2a and an inner ring raceway 4a are increased with respect to the diameter Db of the balls 6. At the same time, the diameter Db of the balls 6 and the thickness of an inner ring 5a are not set excessively small to thereby be able not only to prevent Brinell impressions from being formed in the outer ring raceway 2a but also to prevent the inner ring 5a from being damaged or cracked.

4 Claims, 10 Drawing Sheets

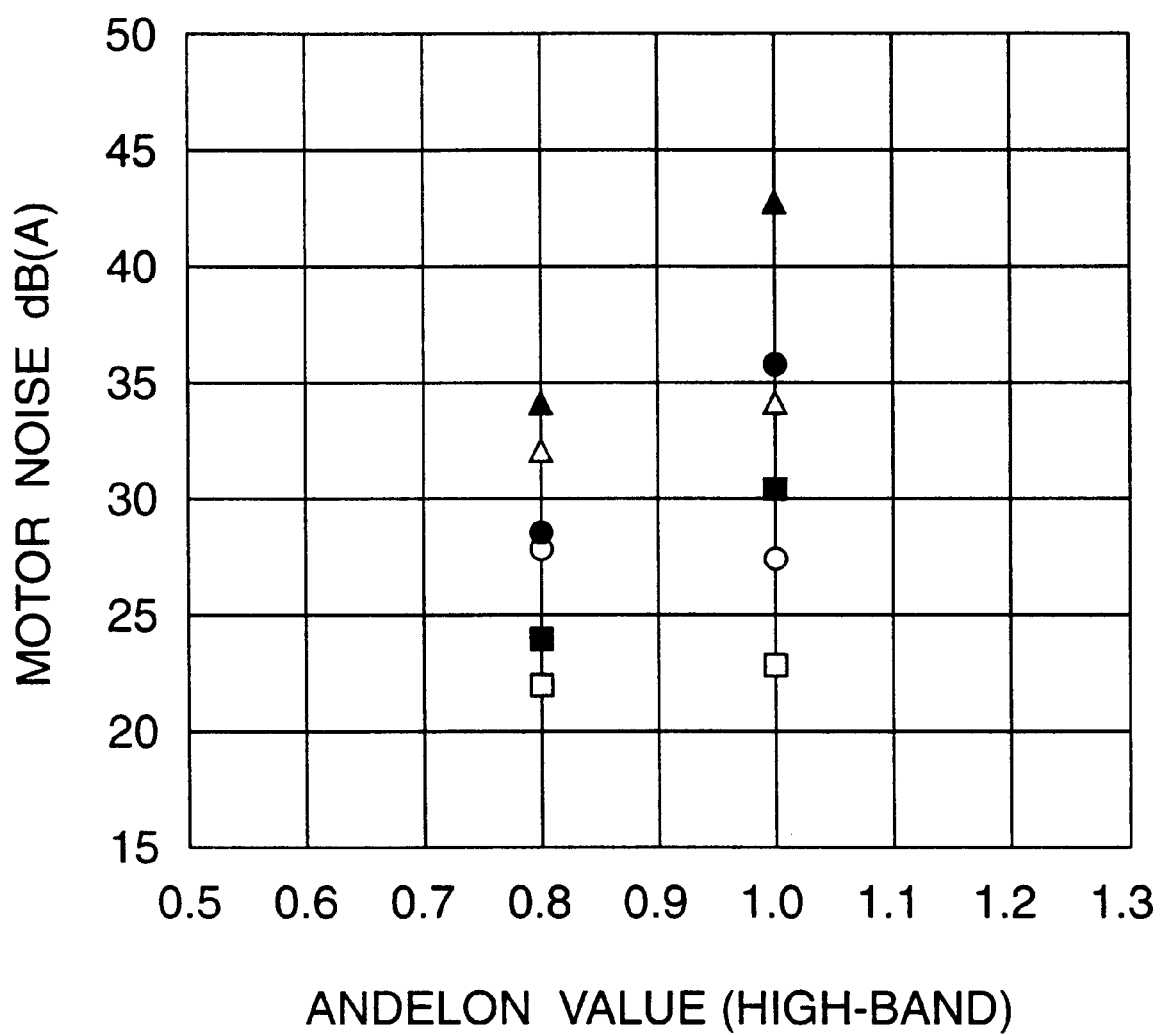

[//]: # (Page 1)

BALL BEARING

BACKGROUND OF THE INVENTION

The present invention relates to a ball bearing, and particularly a ball bearing used to support a rotary shaft, which is disposed in a fan motor of an electric cleaner for domestic use or in a blower of an air conditioner for domestic use and is to be rotated at a high speed with a low load, in such a manner that the rotary shaft can be rotated freely with respect to a housing.

Conventionally, such a ball bearing 1 as shown in FIG. 11 is widely used to support a rotary shaft, which is disposed in various apparatus, in such a manner that it can be freely rotated with respect to a housing. The ball bearing 1 comprises an outer ring 3 including on the inner peripheral surface thereof a deep-groove type of outer ring raceway 2 having an arc-shaped section, an inner ring 5 including on the outer peripheral surface thereof an inner ring raceway 4 having an arc-shaped section, and a plurality of balls 6 respectively interposed between the outer and inner ring raceways 2 and 4 so as to be free to roll; and, the outer ring 3, inner ring 5 and balls 6 are all made of bearing steel such as SUJ2 or M50, ceramic, or the like. The balls 6 are respectively held by a retainer 7 in such a manner that they are able to roll while they are spaced from one another. Also, to the inner peripheral surfaces of the two end portions of the outer ring 3, there are secured the outer peripheral edge portions of sealed rings 8 and 8, whereas the inner peripheral edge portions of the sealed rings 8 and 8 are respectively disposed so as to be close and opposed to the outer peripheral surfaces of the two end portions of the inner ring 5.

By the way, in the case of the conventional ball bearing 1, generally, where the diameter of the respective balls 6 is expressed as Db, the radius of curvature of the section shape of the outer ring raceway 2 is expressed as Ro', and the radius of curvature of the section shape of the inner ring raceway 4 is expressed as Ri', the following equations are established; that is, 0.50<Ro'/Db≦0.53, and 0.50<Ri'/Db≦0.52. Also, where the outside diameter of the outer ring 3 is expressed as D, the inside diameter of the inner ring 5 is expressed as d, and the pitch circle diameter (P.C.D.) of the respective balls 6 is expressed as Dp', the following equation is established; that is, Dp'≈(D+d)/2. In other words, there is employed the equation, that is, Dp'/(D+d)/2≈1, and the respective balls 6 are positioned substantially in the middle of the outer peripheral surface of the outer ring 3 and the inner peripheral surface of the inner ring 5 with respect to the diameter direction of the ball bearing 1.

In case where the above-structured ball bearing 1 is used to support, for example, the rotary shaft of a fan motor disposed in a suction device employed in an electric cleaner, the outer ring 3 is inserted and fixed to a fixed housing, while the inner ring 5 is outserted and fixed to the rotary shaft.

The above-mentioned conventional ball bearing 1 has a general-purpose structure which aims for assembly into one of various rotation support portions, but does not prefer to apply under the low-load and high-speed rotation condition, and, therefore, the rotation torque (rotation resistance) thereof is not always low. On the other hand, there has been increasing a demand for reducing the rotary torque of the rotation support portion in order to be able to cope with a rising energy saving tendency in recent years. In view of such circumstances, it is an urgent need to realize a ball bearing which not only provides a small rotation torque but also can be incorporated into the rotation support portion which rotates at a high speed with a low load. As the simplest means for reducing the rotation torque, it can be expected that, as grease to be applied to the portion where the balls 6 are disposed, grease having low viscosity is used. However, there is a limit to the torque reduction that can be realized by reducing the viscosity of the grease and, therefore, in order to be able to realize large torque reduction, it is necessary to change the structure of the ball bearing itself.

In case where the rotation torque of the rotation support portion rotating at a high speed with a low load is reduced by changing the specifications of the ball bearing, use of a ball bearing whose diameter and diameter-associated elements are reduced in size (that is, a small-sized ball bearing) can realize rather large torque reduction. However, in this case, it is necessary to reduce the inside diameter of a housing into which the outer ring is inserted and fixed, which unfavorably requires the design change of the remaining component members of the rotation support portion. Also, even in case where the diameter and its associated elements of the ball bearing are simply reduced in size, there still remains a possibility that sufficient torque reduction cannot be realized.

SUMMARY OF THE INVENTION

The present invention aims at eliminating the above-mentioned drawbacks found in the conventional ball bearing.

Accordingly, it is an object of the invention to provide a ball bearing which not only can realize a low torque structure but also can be assembled to a housing similar to the conventional ball bearing.

In attaining the above object, according to a first aspect of the invention, there is provided a ball bearing which, similarly to the above-mentioned conventional ball bearing, comprises an outer ring including on the inner peripheral surface thereof an outer ring raceway having an arc-shaped section; an inner ring including on the outer peripheral surface thereof an inner ring raceway having an arc-shaped section; and, a plurality of balls respectively and interposed rollably between the outer and inner ring raceways.

Especially, in the ball bearing according to the invention, where the outside diameter of the outer ring is expressed as D, the inside diameter of the inner ring is expressed as d, the pitch circle diameter of the respective balls is expressed as Dp, the diameter of the groove bottom of an inner ring raceway whose maximum circumferential stress provides (294 MPa) 30 kgf/mm$^2$ under the condition that, in case where d is in the range 6–10 mm, the interference of the inner ring is 11 $\mu$m and in case where d in the range of more than 10 mm up to 18 mm, the interference of the inner ring is 12 $\mu$m, is expressed as Di, x=Db/{(D−d)/2}, and y=Dp/{(D+d)/2}, the following equations (1) to (2) can be satisfied, and also the following equation (3) can be preferably satisfied: that is, $$x \geq 0.3 \quad (1)$$

$$y < 1.0 \quad (2)$$

$$y \geq \{(D-d)/(D+d)\}x + 2Di/(D+d) \quad (3).$$

Also, preferably, where the diameter of the respective balls is expressed as Db, the radius of curvature of the section shape of the outer ring raceway is expressed as Ro, and the radius of curvature of the section shape of the inner ring raceway is expressed as Ri, the following equations (4) and (5) can be satisfied: that is, $$0.53 < Ro/Db \leq 0.65 \tag{4}$$

$$0.52 < Ri/Db \leq 0.65 \tag{5}$$

In the case of the above-structured ball bearing according to the first aspect of the invention, not only sufficient durability can be secured but also sufficient rotation torque reduction can be realized without changing the outside diameter of the outer ring specially.

That is, in order to satisfy the equation (2), the plurality of balls are positioned on the inside diameter side of the ball bearing. This can reduce the moment necessary to roll these balls, therebybeing able to reduce the rotation torque of the ball bearing.

In this manner, even when reducing the rotation torque of the ball bearing, in order to satisfy the equation (1), by securing the diameter Db of the balls, the contact ellipses in the contact portions between the balls and outer ring raceway can be prevented from decreasing in size excessively, which can prevent Brinell impressions from occurring in the outer ring raceway.

Further, in order to satisfy the equation (3), by securing the pitch circle diameter Dp of the balls, even when the inner ring is outserted onto the rotary shaft, circumstantial stress occurring in the inner ring can be prevented from increasing excessively, which can prevent the inner ring against damage such as occurrence of a crack.

By the way, in the equation (3), the inner ring raceway (groove bottom) surface Di depends on the fit standard js5 specified in JIS and on the strength that is required of the inner ring. That is, according to the js5, the upper limit value of the interference of an inner ring is 11 $\mu$m in the case of an inner ring having an inside diameter of 6–10 mm and, in the case of an inner ring having an inside diameter of 10–18 mm, it is 12 $\mu$m.

Further, the outer ring, the inner ring and the plurality of balls are preferably made of bearing steel. Generally, the inner ring raceway surface Di having an influence on the thickness of the groove bottom of the inner ring is specified in such a manner that the maximum stress of bearing steel can be of 137.2 MPa (14 kgf/mm$^2$) or less. However, actually, depending on the selection of the material of the inner ring and on the change of the thermal treatment thereof, up to the stress of 294 Mpa (30 kgf/mm$^2$), the thickness of the groove bottom can be reduced. For this reason, the inner ring raceway surface Di is set at the value where the maximum circumstantial stress provides 294 MPa (30 kgf/mm$^2$).

By the way, referring to the ratio $R_1/D_b$ between the diameter $D_b$ of each ball and the radius of curvature $R_1$ of the section shape of the inner ring raceway, as in a fan motor used in a blower of an air conditioning apparatus, when the fan motor is used at a speed of 10000 min$^{-1}$ (r.p.m.) or less, the ratio is set such that $0.52 < R_1/D_b \leq 0.65$; but, as in a fan motor used in a suction device of an electric cleaner, when the fan motor is used at a speed of 20000 min$^{-1}$ (r.p.m.) or more, preferably, the ratio may be set such that $0.53 < R_1/D_b \leq 0.65$.

Moreover, by satisfying the above equations (4) and (5), contact ellipses, which are formed in the contact portions between the rolling surfaces of the balls and the outer ring and inner ring raceways can be reduced in size so that rolling resistance and spin, which are caused in the contact ellipse portions during rotation, can be reduced to thereby be able to reduce the rotation torque of the ball bearing. By the way, in case where the values of Ro/Db and Ri/Db exceed 0.65 and increase excessively, the area of each of the contact ellipses is reduced excessively, which makes it difficult to secure the rolling fatigue lives of the outer and inner ring raceways; and, especially, in the case of the outer ring raceway, Brinell impressions are easy to occur. For these reasons, the upper limit values of Ro/Db and Ri/Db are set at 0.65.

In attaining the above object, according to a second aspect of the invention, there is provided a ball bearing for use in an electric cleaner which comprises an outer ring made of bearing steel and including on the inner peripheral surface thereof an outer ring raceway having an arc-shaped section; an inner ring made of bearing steel and including on the outer peripheral surface thereof an inner ring raceway having an arc-shaped section; and, a plurality of balls respectively made of bearing steel and interposed rollably between the outer and inner ring raceways.

And, the present electric cleaner ball bearing is incorporated into the rotation support portion of the electric cleaner and is used in such a manner that the outer ring is fixed and the inner ring is rotated at the speed of 40,000–60,000 min$^{-1}$ (r.p.m).

Especially, in the ball bearing according to the second aspect of the invention, where the diameter of the respective balls is expressed as Db, the radius of curvature of the section shape of the outer ring raceway is expressed as Ro, and the radius of curvature of the section shape of the inner ring raceway is expressed as Ri, the following equations (1) and (2) can be satisfied: that is, $$0.58 \leq Ro/Db \leq 0.61 \tag{1}$$

$$0.52 \leq Ri/Db \leq 0.61 \tag{2}$$

In the case of the above-structured ball bearing for an electric cleaner according to the second aspect of the invention, not only sufficient durability can be secured but also sufficient rotation torque reduction can be realized without reducing the outside diameter of the outer ring specially.

That is, by satisfying the above equations (1) and (2), contact ellipses, which are formed in the contact portions between the rolling surfaces of the balls and the outer ring and inner ring raceways, can be reduced in size so that rolling resistance and spin, which are caused in the contact ellipse portions during rotation, can be reduced to thereby be able to reduce the rotation torque of the ball bearing.

By the way, the reason why, as described above, the ratios of the radius of curvature of the section shape of the outer ring raceway Ro and the radius of curvature of the section shape of the inner ring raceway Ri to the diameter of the respective balls Db are respectively set in the range of 58–61% is as follows. That is, as these ratios increase, the contact ellipses formed in the respective contact portions decrease in size, thereby being able to reduce the rotation torque of the ball bearing. Therefore, in order to reduce the rotation torque of the ball bearing, it is preferred to increase these ratios (that is, Ro/Db and Ri/Db) . On the other hand, in case where these ratios are increased, the surface pressures of the respective contact portions increase, which lowers the exfoliation lives of the outer ring raceway and inner ring raceways. Here, FIG. 10 shows the relation between the above ratios and the exfoliation lives of the outer and inner raceways under the operation conditions {rotation speed=60,000 min$^{-1}$ (r.p.m.), and preload of 49 N (5 kgf)} of a ordinary electric cleaner ball bearing (the outside diameter D of an outer ring=22 mm, the inside diameter d of an inner ring=8 mm, and the width B of the ball bearing=7 mm).

As can be seen clearly from FIG. 10, generally, when the durability of the rotation support portion is taken into account, it is not expedient to form outer and inner ring raceways having such large radiuses of curvature that provide the ratios (that is, Ro/Db and Ri/Db) of more than 56%. On the other hand, as in an electric cleaner ball bearing to which the present invention relates, when a ball bearing is used under the conditions that the rotation portion is rotated at a high speed with a low load and dust such as brush friction powder can invade into the interior portion of the ball bearing, the life of the ball bearing depends, in many cases, on the occurrence of seizure rather than on the coming of the exfoliation life. And, due to the enhanced speed of the rotation of the rotation support portion, in many cases, such seizure occur in the range of 2,000–3,000 hours. Therefore, it is no expedient that, in order to obtain an exfoliation life which exceeds greatly 2,000–3,000 hours, the above ratios are reduced (that is, the ratios are approximated to 50%), because this increases the rotation torque of the ball bearing. When such circumstances are taken into consideration, in case where the above ratios are respectively set in the range of 58–61%, not only a practically sufficient exfoliation life can be secured but also the rotation torque of the ball bearing can be reduced to a sufficient degree.

BRIEF DESCRIPTION OF THE DRAWINGS

FIG. 4(A) is an end view thereof and FIG. 4(B) is a section view thereof;

FIG. 7 is bar graphs of the results of a test conducted to confirm the influences of the difference in the pitch circle diameter with respect to a relationship between ANDELON value and Motor Noise;

DETAILED DESCRIPTION OF THE PREFERRED EMBODIMENTS

Figure 1:
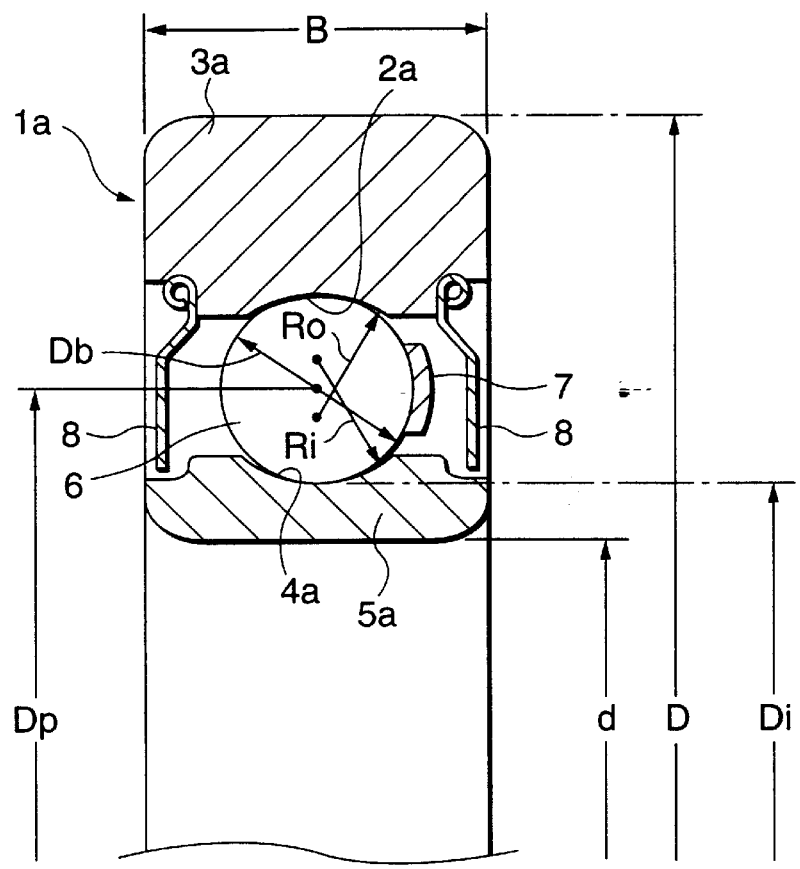
FIG. 1 is a partial section view of a first example of a mode for carrying out the invention.
Figure 11:
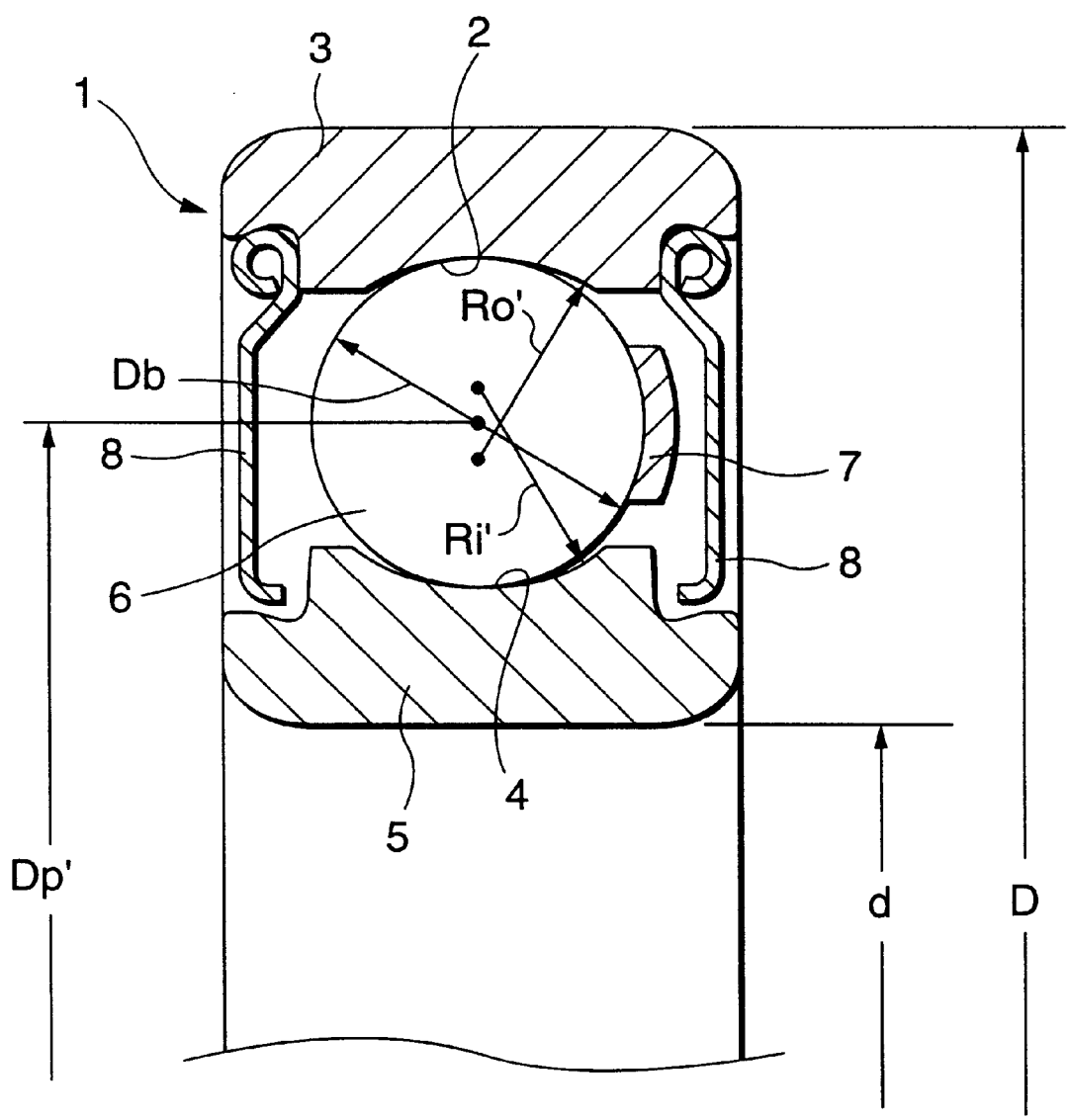
FIG. 11 is a partial section view of a conventional ball bearing.

Now, FIG. 1 shows a first example of a mode for carrying out the invention. According to the present mode, a ball bearing $1a$, similarly to the conventionally known ball bearing 1 that is shown in the above-mentioned FIG. 11, comprises an outer ring $3a$ including on the inner peripheral surface thereof a deep-groove type of outer ring raceway $2a$ having an arc-shaped section, an inner ring $5a$ including on the outer peripheral surface thereof an inner ring raceway $4a$ having an arc-shaped section, and a plurality of balls 6 respectively interposed between the outer and inner ring raceways $2a$ and $4a$ so as to be free to roll. The balls 6 are respectively held by a retainer 7 in such a manner that they are able to roll while they are spaced from one another. Also, to the inner peripheral surfaces of the two end portions of the outer ring $3a$, there are secured the outer peripheral edge portions of sealed rings 8 and 8, while the inner peripheral edge portions of the sealed rings 8 and 8 are respectively disposed so as to be close to but opposed to the outer peripheral surfaces of the two end portions of the inner ring $5a$.

The outer ring $3a$, the inner ring $5a$ and the plurality of balls 6 are preferably made of bearing steel, such as SUJ2, M50 or the like in this embodiment. It is, however, possible to make them with a steel, a ceramic or the like instead of the bearing steel, if required. Especially, in the case of the ball bearing $1a$ according to the invention, where the outside diameter of the outer ring $3a$ is expressed as D, the inside diameter of the inner ring is expressed as d, the pitch circle diameter of the respective balls 6 is expressed as Dp, the diameter of an inner ring raceway whose maximum circumferential stress provides 294 MPa (30 kgf/mm$^2$) under the condition that, in case where d is in the range 6–10 mm, the interference of the inner ring is 11 μm, and in case where d in the range of more than 10 mm up to 18 mm, the interference of the inner ring is 12 μm, is expressed as Di, x=Db/{(D−d)/2}, and y=Dp/{(D+d)/2}, the following equations (1) to (2) can be satisfied, and also the following equation (3) can be preferably satisfied: that is, $$x \geq 0.3 \qquad (1)$$

$$y < 1.0 \qquad (2)$$

$$y \geq \{(D-d)/(D+d)\}x + 2Di/(D+d) \qquad (3)$$

Also, where the diameter of the respective balls 6 is expressed as Db, the radius of curvature of the section shape of the outer ring raceway $2a$ is expressed as Ro, and the radius of curvature of the section shape of the inner ring raceway $4a$ is expressed as Ri, the following equations (4) and (5) can be satisfied: that is, $$0.53 < Ro/Db \leq 0.65 \qquad (4)$$

$$0.52 < Ri/Db \leq 0.65 \qquad (5).$$

In case where the above-structured ball bearing $1a$ is used to support, for example, the rotary shaft of a fan motor for a suction device employed in an electric cleaner, the outer ring $3a$ is inserted into and fixed to a fixed housing, while the inner ring $5a$ is outserted and fixed to the rotary shaft. By the way, the ball bearing $1a$ according to the invention is a ball bearing which not only is used to support the rotary shaft of a domestic-use electric cleaner or the rotary shaft of a blower of a domestic-use air conditioner on a housing but also is used under a low-load and high-speed rotation condition. Referring more specifically to the size of the ball bearing $1a$, the outside diameter D of the outer ring $3a$ is of the order of 15–40 mm, the inside diameter d of the inner ring $5a$ is of the order of 6–18 mm, and the width B of the ball bearing $1a$ is of the order of 5–12 mm.

By the way, a case, in which the inside diameter d of the inner ring $5a$ is less than 6 mm, can also fall under the scope of the invention. In this case, $D_1$ in the equation (3)

expresses the diameter of an inner ring raceway which provides the maximum circumferential stress of 294 MPa (30 kgf/mm$^2$), under the condition that the interference of the inner ring is expressed by a curved line allowing the following three points to be smoothly continuous with one another, that is, a first point where the inner ring interference is 6 μm for the inner ring inside diameter of 5 mm, a second point where the inner ring interference is 2 μm for the inner ring inside diameter of 4 mm, and a third point where the inner ring interference is 1 μm for the inner ring inside diameter 3 mm. That is, based on a curved line which allows the above three points, which are plotted in perpendicular coordinates in which the inner ring inside diameter d is shown in one of the vertical and horizontal axes thereof and the inner ring interference is shown in the other, to be smoothly continuous with one another, there is obtained an inner ring raceway whose maximum circumferential stress provides 294 MPa and the diameter of the present inner ring raceway is expressed as $D_1$. In case where the inside diameter d is less than 6 mm, there is a possibility that not only the outer ring outside diameter D can be less than 15 mm but also the width B can be less than 5 mm.

Figure 2:
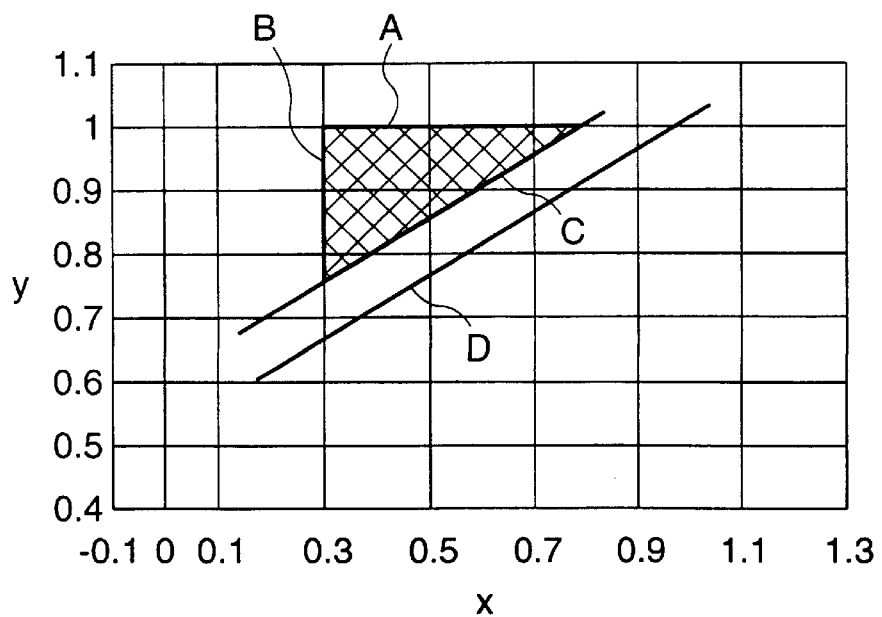
FIG. 2 is a graphical representation of the technical scope of the invention.

In the case of the above-structured ball bearing 1a according to the invention, not only sufficient durability can be secured but also, without reducing the outside diameter of the outer ring specially, sufficient rotation torque reduction can be realized. Now, description will be given below of such characteristics of the present ball bearing 1a with reference to FIG. 2. Here, in FIG. 2, the above-mentioned $x=Db/\{(D-d)/2\}$ is shown by the horizontal axis, and $y=Dp/\{(D+d)/2\}$ is shown by the vertical axis, respectively; and, a triangular portion, the three sides of which are surrounded by three straight lines A, B and C and also which is shown by oblique checks, shows the technical scope of the invention. By the way, a straight line D, which is situated downwardly of the triangular portion, shows a portion in which the thickness of the inner ring 5a provides 0 in the above-mentioned inner ring raceway 4a portion. Therefore, downwardly of the straight line D, the present ball bearing cannot be established.

At first, in the case of the ball bearing 1a according to the invention, in order to satisfy the equation (2), the thickness of the outer ring 3a with respect to the diameter direction of the ball bearing 1a is set larger than the thickness of the inner ring 5a, and the positions of the balls 6 (that is, pitch circle diameters thereof) are arranged on the inside diameter side of the ball bearing 1a. That is, by manufacturing the ball bearing 1a downwardly of the straight line A in FIG. 2, the moment that is necessary to roll the balls 6 can be reduced to thereby be able to reduce the rotation torque of the ball bearing 1a. In this manner, even in case where the rotation torque of the ball bearing 1a is reduced, it is not necessary to reduce the outside diameter D of the outer ring 3a over the conventional structure and thus it is not necessary to change the inside diameter of the housing to which the outer ring 3a is to be inserted and fixed. Therefore, the housing, which has been conventionally used, can be used as it is.

By the way, in order that, without reducing the outside diameter D of the outer ring 3a, the pitch circle diameter $D_p$ is reduced to thereby be able to reduce the torque, there is set such that y<1 as in the equation (2). However, in order to be able to reduce the torque sufficiently, preferably, the value of y may be set equal to or less than 0.95 and, more preferably, the value of y may be set equal to or less than 0.9. The lower limit value of y is restricted by a straight line C shown in FIG. 2.

Also, in order to satisfy the equation (5), by securing the diameter Db of the balls 6, the contact ellipses in the contact portions between the rolling surfaces of the balls 6 and the outer ring raceway 2a can be prevented from being excessively reduced in size, which in turn can prevent Brinell impressions from being caused in the outer ring raceway 2a. That is, the diameter Db of the balls 6 is secured in such a manner that the ball bearing 1a can be manufactured on the right side of the straight line B in FIG. 2. By the way, the outer ring raceway 2a is structured in such a manner that not only its cross section extending in the axial direction of the ball bearing 1a is a concave surface but also its cross section extending in the circumferential direction of the ball bearing 1a is also a concave surface. The thus structured outer ring raceway 2a is smaller in yield strength with respect to a pressing force applied thereto than the inner ring raceway 4a whose cross section extending in the circumferential direction of the ball bearing 1a is a convex surface. Thus, even when the radius of curvature Ro of the cross section of the outer ring raceway 2a is increased in order to reduce the contact ellipses in size, in case where the diameter Db of the balls 6 is secured to a certain degree, it is possible to prevent the contact ellipses from being reduced in size excessively. More specifically, by satisfying the equation (1), the maximum surface pressure to be applied onto the outer ring raceway 2a is controlled down to 1960 MPa (200 kgf/mm$^2$) or less, which makes it possible to prevent the Brinell impressions from being caused in the outer ring raceway 2a.

Further, in order to satisfy the equation (3), in case where the pitch circle diameter Dp of the balls 6 is secured to thereby outsert the inner ring 5a to the rotary shaft, it is possible to prevent circumferential stresses caused in the inner race 5a from increasing excessively. That is, the pitch circle diameter Dp and diameter Db of the balls 6 are restricted so as to exist upwardly of the straight line C in FIG. 2. By the way, when the ball bearing 1a is in use, the inner ring 5a is outserted and fixed to the rotary shaft by close fit. Therefore, to the inner ring 5a, when it is in use, there is applied a tensile stress which acts in the circumferential direction thereof. In case where the tensile stress becomes excessively large, there is a possibility that there can be caused damage such as a crack in the inner ring 5a. However, in case where the equation (3) is satisfied, the maximum tensile stress can be controlled down to 294 Mpa (30 kgf/mm$^2$) or less, which makes it possible to prevent the inner ring 5a against such damage.

In addition, by satisfying the above equations (4) and (5), contact ellipses, which are formed in the contact portions between the rolling surfaces of the balls 6 and the outer ring and inner ring raceways 2a, 4a, can be reduced in size so that rolling resistance and spin, which are caused in the contact ellipse portions during rotation, can be reduced to thereby be able to reduce the rotation torque of the ball bearing 1a.

Figure 3:
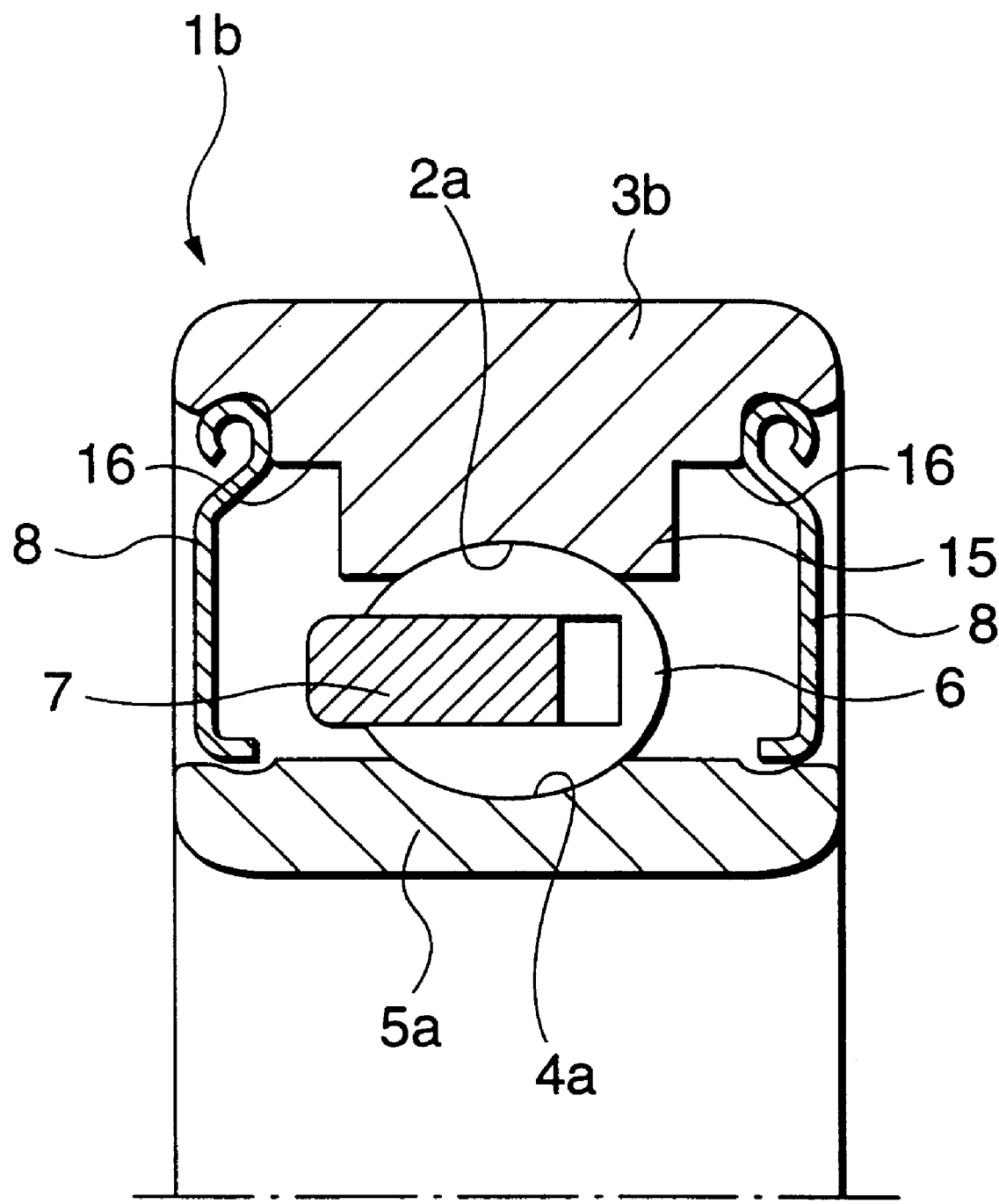
FIG. 3 is a partial section view of a second example of a mode for carrying out the invention.

Next, FIG. 3 shows a second example according to a mode for carrying out the invention. In the present example, in the central portion of the inner peripheral surface of the outer ring 3b where there is formed an outer ring raceway 2a, there is formed a center projecting portion 15 having a diameter which is sufficiently smaller than the diameters of the two end portions of the inner peripheral surface in the axial direction thereof. And, between the two side surfaces of the center projecting portion 15 and the inner surfaces of sealed rings 8, 8 whose outer peripheral edges are respectively secured to the two end portions of the inner peripheral surface of the outer ring 3b, there are formed hold recessed portions 16, 16 which respectively extend over the whole periphery of the associated surfaces. These hold recessed portions 16, 16 respectively function as grease storage portions and can continue to supply lubricating oil to the contact portions between the rolling surfaces of the balls 6 and the outer ring raceway 2a, inner ring raceway 4a for a long period of time. In the case of the invention, since the thickness of the outer ring 3b in the diameter direction thereof is set large, the capacities of the hold recessed portions 16, 16 can be increased and thus the grease hold quantities thereof can be increased, thereby being able to enhance the durability of the ball bearing 1b. The remaining portions of the structure and operation of the present example are similar to those of the previously described first example.

Now, description will be given below of the results of the tests that were conducted for confirmation of the effects of the first aspect of the invention. Specifically, there were conducted the following three kinds of tests: that is, a test (a first test) which was conducted in order to know the influence of the pitch circle diameter $D_p$ of the ball 6 on the rotation torque of the ball bearing; a test (a second test) conducted in order to know the influence of the radiuses of curvature of the section shapes of the respective raceways on the rotation torque of the ball bearing; and, a test (a third test) conducted in order to know the influences of the pitch circle diameter $D_p$ of the ball 6 and the diameter $D_b$ of the ball 6 on the noise that is produced by the motor. In these tests, except for part of them, there was used a ball bearing of a deep groove type in which the outside diameter D of the outer ring 3a is 22 mm, the inside diameter d of the inner ring 5a is 8 mm, and the width B of the bearing is 7 mm. As will be discussed later, in these tests, there were prepared eleven kinds of embodiments which fall under the technical scope of the invention, and seven kinds of comparison examples which do not fall under the technical scope of the invention, that is, a total of eighteen kinds of test samples. The outer ring 3a, inner ring 5a and balls 5 were all made of SUJ2.

Embodiment 1

$Ro/Db=0.60$ $Ri/Db=0.60$ $x=Db/\{(D-d)/2\}=0.45$ $y=Dp/\{(D+d)/2\}=0.45$

Number of balls=8

Embodiment 2

$Ro/Db=0.60$ $Ri/Db=0.60$ $x=Db/\{(D-d)/2\}=0.34$ $y=Dp/\{(D+d)/2\}=0.89$

Number of balls=10

Embodiment 3

$Ro/Db=0.60$ $Ri/Db=0.60$ $x=Db/\{(D-d)/2\}=0.57$ $y=Dp/\{(D+d)/2\}=0.90$

Number of balls=6

Embodiment 4

$Ro/Db=0.60$ $Ri/Db=0.60$ $x=Db/\{(D-d)/2\}=0.45$ $y=Dp/\{(D+d)/2\}=0.85$

Number of balls=7

Embodiment 5

$Ro/Db=0.60$ $Ri/Db=0.60$ $x=Db/\{(D-d)/2\}=0.34$ $y=Dp/\{(D+d)/2\}=0.79$

Number of balls=8

Embodiment 6

$Ro/Db=0.56$ $Ri/Db=0.56$ $x=Db/\{(D-d)/2\}=0.45$ $y=Dp/\{(D+d)/2\}=0.92$

Number of balls=8

Embodiment 7

$Ro/Db=0.60$ $Ri/Db=0.60$ $x=Db/\{(D-d)/2\}=0.45$ $y=Dp/\{(D+d)/2\}=0.92$

Number of balls=8

Embodiment 8

$Ro/Db=0.65$ $Ri/Db=0.65$ $x=Db/\{(D-d)/2\}=0.45$ $y=Dp/\{(D-d)/2\}=0.92$

Number of balls=8

Embodiment 9

$Ro/Db=0.56$ $Ri/Db=0.56$ $x=Db/\{(D-d)/2\}=0.34$ $y=Dp/\{(D+d)/2\}=0.79$

Number of balls=10

Embodiment 10

$Ro/Db=0.60$ $Ri/Db=0.60$ $x=Db/\{(D-d)/2\}=0.34$ $y=Dp/\{(D+d)/2\}=0.79$

Number of balls=10

Embodiment 11

$Ro/Db=0.65$ $Ri/Db=0.65$ $x=Db/\{(D-d)/2\}=0.34$ $y=Dp/\{(D+d)/2\}=0.79$

Number of balls=10

COMPARISON EXAMPLE 1

$Ro/Db=0.60$ $Ri/Db=0.60$ $x=Db/\{(D-d)/2\}=0.57$ $y=Dp/\{(D+d)/2\}=1.00$

Number of balls=7

COMPARISON EXAMPLE 2

$Ro/Db=0.60$ $Ri/Db=0.60$ $x=Db/\{(D-d)/2\}=0.45$ $y=Dp/\{(D+d)/2\}=1.00$

Number of balls=8

COMPARISON EXAMPLE 3

$Ro/Db=0.60$ $Ri/Db=0.60$ $x=Db/\{(D-d)/2\}=0.34$ $y=Dp/\{(D+d)/2\}=1.00$

Number of balls=11

COMPARISON EXAMPLE 4

$Ro/Db=0.51$ $Ri/Db=0.51$ $x=Db/\{(D-d)/2\}=0.45$ $y=Dp/\{(D+d)/2\}=0.92$

Number of balls=8

COMPARISON EXAMPLE 5

$Ro/Db=0.53$ $Ri/Db=0.52$ $x=Db/\{(D-d)/2\}=0.45$ $y=Dp/\{(D+d)/2\}=0.92$

Number of balls=8

COMPARISON EXAMPLE 6

$Ro/Db=0.51$ $Ri/Db=0.51$ $x=Db/\{(D-d)/2\}=0.34$ $y=Dp/\{(D+d)/2\}=0.79$

Number of balls=10

COMPARISON EXAMPLE 7

$Ro/Db=0.53$ $Ri/Db=0.52$ $x=Db/\{(D-d)/2\}=0.34$ $y=Dp/\{(D+d)/2\}=0.79$

Number of balls=10

Now, at first, of the above-mentioned eighteen kinds of samples, using the five embodiments 1–5 and three comparison examples 1–3, that is, a total of eight kinds of samples, the influence of the pitch circle diameter Dp of the balls 6 on the rotation torque of the ball bearing was confirmed by using such a test apparatus 9 as shown in FIG. 3. The test apparatus 9 comprises a rotary shaft 10 and a housing 11 which are disposed concentric with each other. In measuring the above rotation torque, ball bearings 1a, 1a having the same structure were assembled between the outer peripheral surface of the rotary shaft 10 and the inner peripheral surface of the housing 11 and, after then, the rotary shaft 10 was rotated, whereby rotation torque applied to the leading end portion of an arm 12 fixed to the outer peripheral surface of the housing was measured by a load sensor 13. By the way, in every sample, grease for lubrication was applied into the ball bearings 1a, 1a and two end portions of the ball bearings 1a, 1a were sealed by sealed rings 8, 8 each of a non-contact type (see FIG. 1). Also, the test apparatus was operated at room temperature in the air. Further, a preload of 49N (5 kgf) was applied to the respective ball bearings 1a, 1a using a spring 14. The rotation speed ($d_m n$=the product of the pitch circle diameter and the number of rotations per minute) of the rotary shaft 10 was varied in the range of four hundred thousand to nine hundred thousand (400000–900000) $d_m n$, and the rotation torque after the passage of ten minutes from the start of the operation of the test apparatus was measured.

Figure 4A:
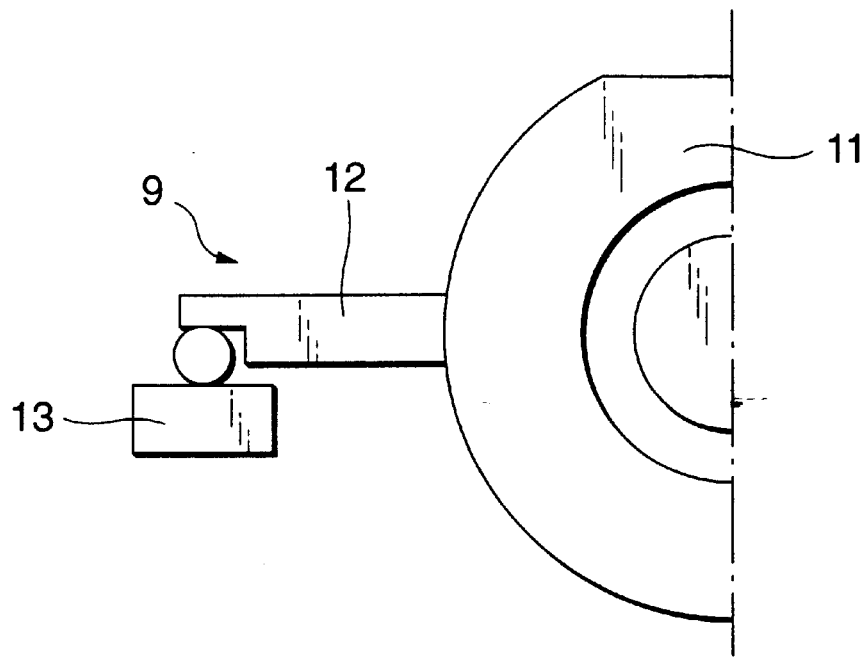
FIGS. 4(A) and 4(B) shows a test apparatus used to confirm the effects of the invention; in particular.
Figure 4B:
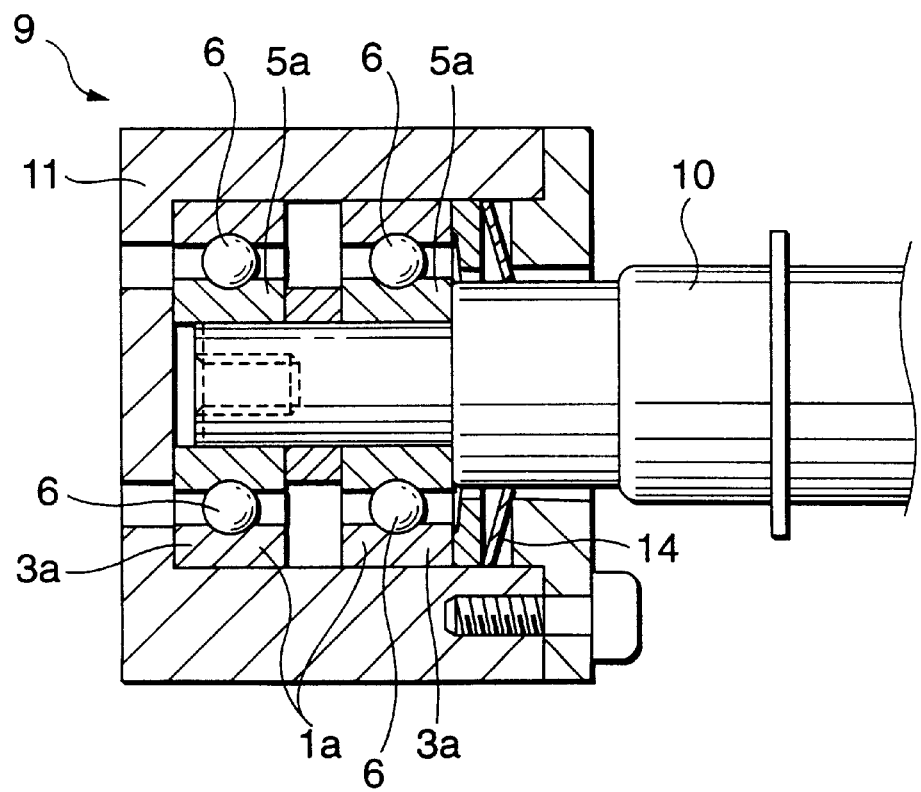

The results of the test conducted in this manner are shown in FIG. 4. In FIG. 4, (A) shows the relation between the rotation speed and rotation torque in the embodiment 3 and comparison example 1 in which only the value of $y=Dp/\{(D+d)/2\}$ and the number of balls were varied. Also, (B) shows the relation between the rotation speed and rotation torque in the embodiments 1, 4 and comparison example 2 in which only the value of $y=Dp/\{(D+d)/2\}$ and the number of balls were varied. Further, (C) shows the relation between the rotation speed and rotation torque in the embodiments 2, 5 and comparison example 3 in which only the value of $y=Dp/\{(D+d)/2\}$ and the number of balls were varied. And, in FIGS. 4(A)–(C), the value of the rotation torque in 900000 $d_m n$ in the respective comparison examples is assumed to be 1, and the values of the rotation torque occurring in the remaining rotation speeds ($d_m n$) are expressed as the ratios with respect to the reference value, that is, 1.

Similar tests, as shown in Tables 1 and 2, were made while changing the sizes of the ball bearings and, according to the results of these tests, it has been confirmed that to reduce the size of the pitch circle is effective in reducing the rotation torque of the bearing.

TABLE 1

|  | Dp = 15 (mm) | Dp = 13 (mm) |
| --- | --- | --- |
| Maximum Value | 196 | 107.8 |
| Averaged Value | 176.4 | 88.2 |
| Minimum Value | 156.8 | 58.8 |

TABLE 2

|  | Dp = 23 (mm) | Dp = 21.5 (mm) |
| --- | --- | --- |
| Maximum Value | 1332.8 | 735 |
| Average Value | 1225 | 705.6 |
| Minimum Value | 1078 | 686 |

By the way, of the tests the results of which are shown in these tables 1 and 2, the test the results of which are shown in the table 1, as described above, was conducted using a ball bearing of a deep groove type in which the outside diameter D of an outer ring $3a$ is 22 mm, the inside diameter d of an inner ring $4a$ is 8 mm, and the width B of the bearing is 7 mm. Also, the ratio of the grease quantity with respect to the capacity of a gap existing between the outer ring $3a$ and inner ring $4a$ (that is, the grease filling ratio) was set at 35%, and the rotation speed of the motor was set at 1800 $\text{min}^{-1}$. On the other hand, the test the results of which are shown in the table 2 was conducted using a ball bearing of a deep groove type in which the outside diameter D of an outer ring $3a$ is 32 mm, the inside diameter d of an inner ring $4a$ is 15 mm, and the width B of the bearing is 9 mm. Also, the ratio of the grease quantity with respect to the capacity of a gap existing between the outer ring $3a$ and inner ring $4a$ was set at 30%, and the rotation speed of the motor was set at 1800 $\text{min}^{-1}$. Here, the unit that is used to express the value of the rotation torque shown in Tables 1 and 2 is mN·cm.

Figure 5A:
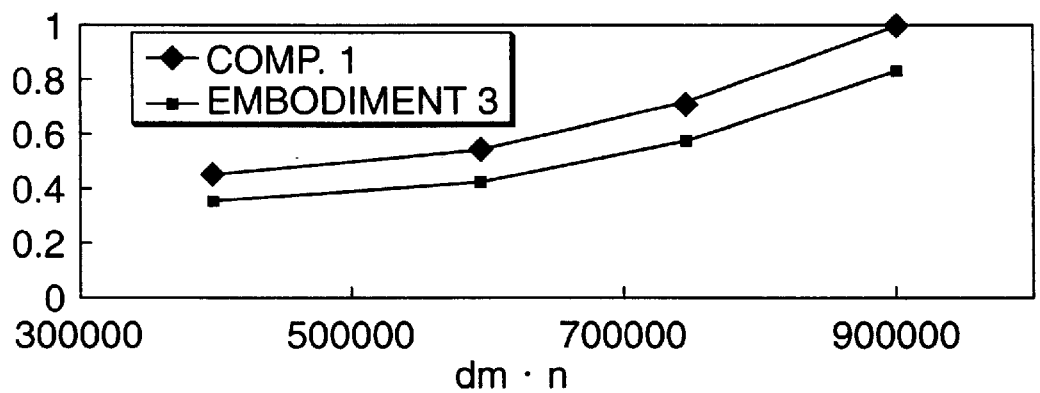
FIGS. 5(A), 5(B) and 5(C) are graphical representations of the results of a test conducted to confirm the influence of a pitch circle diameter on the rotation torque of a ball bearing.
Figure 5B:
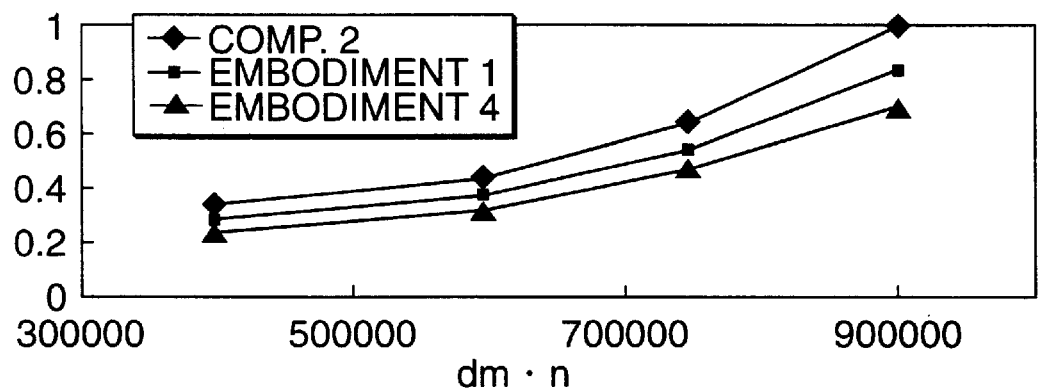
Figure 5C:
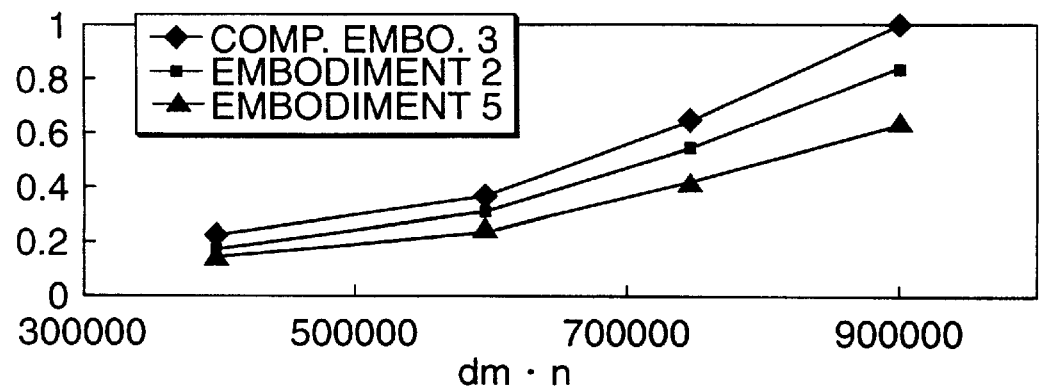

As can be seen clearly from FIGS. 5(A) to (C) and from Tables 1, 2, by reducing the value of the pitch circle diameter $D_p$, the rotation torque of the ball bearing can be reduced regardless of the size of the ball bearing.

Next, of the above-mentioned eighteen kinds of samples, using the five embodiments 6–11 and three comparison examples 4–7, that is, a total of ten kinds of samples, the influences of the radius of curvature Ro of the section shape of the outer ring raceway $2a$ and the radius of curvature Ri of the section shape of the inner ring raceway $4a$ on the rotation torque of the ball bearing were confirmed also by the test apparatus 9 as shown in FIG. 3. The test conditions of this test were the same as in the above-mentioned test conducted on the pitch circle diameter Dp.

Figure 6A:
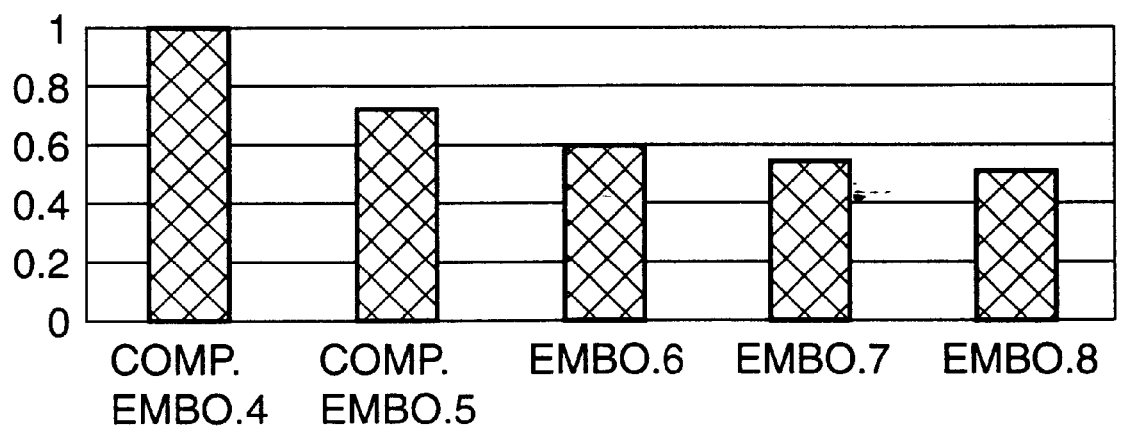
FIGS. 6(A) and 6(B) are bar graphs of the results of a test conducted to confirm the influences of the ratios of the radiuses of curvature of outer and inner ring raceways to the ball diameter on the rotation torque of a ball bearing.
Figure 6B:
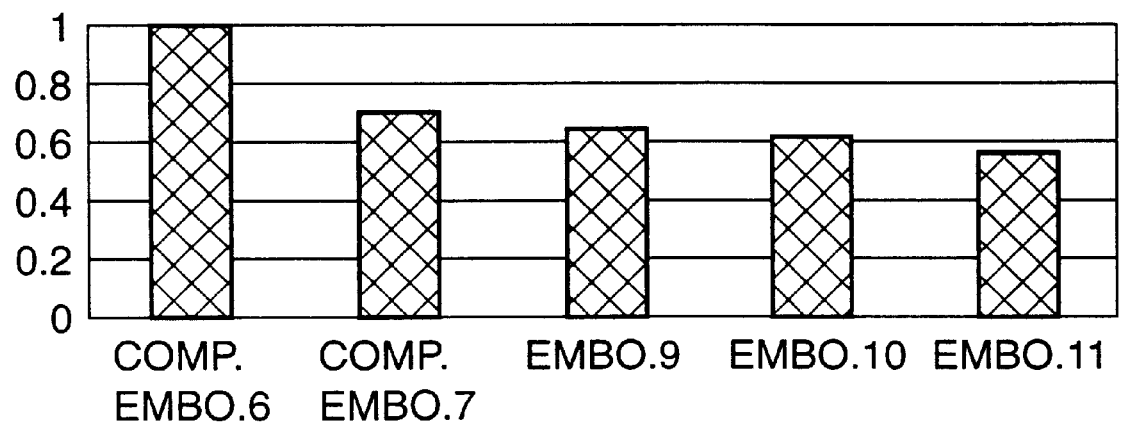

The results of the test conducted in this manner are shown in FIGS. 6(A) and 6(B). FIG. 6(A) shows the values of the rotation torque at the rotation speed of 900000 $d_m n$ respectively in the embodiments 6–8 and comparison examples 4, 5 in which only the ratios of the radiuses of curvature Ro, Ri of the outer and inner ring raceways to the ball diameter Db were varied. Also, FIG. 6(B) shows the values of the rotation torque at the rotation speed of 900000 $d_m n$ respectively in the embodiments 8–11 and comparison examples 6, 7 in which only the ratios of the radiuses of curvature Ro, Ri to the ball diameter Db were varied. In both of FIGS. 6(A) and 6(B), the value of the rotation torque at the rotation speed of 900000 $d_m n$ in the comparison example that is largest in the rotation torque is assumed to be 1, and the values of the rotation torque respectively in the remaining rotation speeds ($d_m n$) are expressed as the ratios with respect to the reference value, that is, 1. As can be seen clearly from FIGS. 5 (A)–(C), by reducing the values of the ratios of the radiuses of curvature Ro, Ri to the ball diameter Db, the rotation torque can be reduced.

In the next table 3, the influences of the radiuses of curvature of the section shapes of the raceways on the values of the rotation torque are shown more specifically using numerical values. The test the results of which are shown in the table 3 was conducted using a ball bearing of a deep groove type in which the outside diameter D of an outer ring $3a$ is 22 mm, the inside diameter d of an inner ring $4a$ is 8 mm, and the width B of the bearing is 7 mm. And, the ratio of the grease quantity with respect to the capacity of a gap existing between the outer ring $3a$ and inner ring $4a$ was set at 30%, and the rotation speed of the motor was set at 1800 $\text{min}^{-1}$. Also, the radius of curvature of the outer ring raceway $2a$ was left unchanged at $R_o/D_b=0.53$, whereas only the radius of curvature of the inner ring raceway $4a$ was changed in two ways, that is, $R_1/D_b$ was changed to 0.51 and 0.52. By the way, as a unit of the value of the torque shown in Table 3, there is also used mN cm.

Table 3 also shows that, by increasing the value of the ratios of the radiuses of curvature $R_0$, $R_1$ of the respective raceways to the diameter $D_b$ of the rolling bodies, the rotation torque of the ball bearing can be reduced.

TABLE 3

|  | $R_1/D_b = 0.51$ | $R_1/D_b = 0.52$ |
| --- | --- | --- |
| Maximum Value | 196 | 176.4 |
| Averaged Value | 176.4 | 147 |
| Minimum Value | 156.8 | 127.4 |

Next, description will be given below of the third test which as conducted in order to know the influences of the pitch circle diameter $D_p$ of the ball 6 and the diameter $D_b$ of the ball 6 on ANDELON value and the motor noise. At first, the test aiming at confirming the influences of the pitch circle diameter $D_p$ of the ball 6 and the diameter $D_b$ of the ball 6 on the ANDELON value was conducted using a ball bearing of a deep groove type in which the outside diameter D of an outer ring $3a$ is 22 mm, the inside diameter d of an inner ring $4a$ is 8 mm, the width B of the bearing is 7 mm, and the grease filling ratio is set at 35%. Under this condition, there were prepared two kinds of samples, two or more samples for each kinds: in one of the two kinds, the pitch circle diameter $D_p$ of the ball 6 is set at 15 mm, and the diameter $D_b$ of the ball 6 is set at 3.97 mm (5/32 inches); and, in the other, the pitch circle diameter $D_p$ of the ball 6 is set at 13 mm, and the diameter $D_b$ of the ball 6 is at 3.18 mm (1/8 inches). And, the ANDELON values (High-Band) were measured. The results of the measurement are shown in the next table 4.

TABLE 4

|  | Dp = 15 (mm)<br>Db = 5/32 (inch) | Dp = 13 (mm)<br>Db = 1/8 (inch) |
| --- | --- | --- |
| Maximum Value | 1.2 | 1.1 |
| Averaged Value | 1.1 | 0.9 |
| Minimum Value | 0.9 | 0.7 |

As can be seen clearly from Table 4 which shows the results of the above-mentioned test, as in the invention, in case where the pitch circle diameter $D_p$ of the ball 6 is reduced to thereby reduce the diameter $D_b$ of the ball 6, the ANDELON values can be enhanced. The reason for this is believed that the reduction in the diameter of the balls 6 reduces the kinetic energy of the balls 6 to thereby reduce the vibratory forces that are produced by the balls 5.

Also, there was conducted a test in order to know the values of the motor noises that are produced when ball bearings having different pitch circle diameters $D_p$ but having the same ANDELON values are actually incorporated into a motor. In this test, there was used a ball bearing of a deep groove type in which the outside diameter D of an outer ring 3a is 32 mm, the inside diameter d of an inner ring 5a is 15 mm, and the width B is 9 mm. Under this condition, there were prepared two kinds of samples, two or more samples for each kind: that is, in one of the two kinds, the pitch circle diameter $D_p$ of the ball is set at 21.5 mm; and, in the other, the pitch circle diameter $D_p$ of the ball is set at 23 mm. Specifically, in this test, after the respective ANDELON values (High-Band) of the samples of the two kinds were measured, there were measured the motor noises that were produced in a state that the respective bearings were incorporated into the motor. The measured results of this test are shown in FIG. 7.

In FIG. 7, there are shown six marks for each of the two kinds of samples respectively having different pitch circle diameters $D_p$, that is, a total of twelve marks. Of these twelve marks, a white round mark expresses the average value of the motor noises that were produced when using the ball bearing whose pitch circle diameter $D_p$ is 21.5 mm, a white triangular mark expresses the maximum value thereof, and a while square mark expresses the minimum value thereof, respectively; and, a black round mark expresses the average value of the motor noises that were produced when using the ball bearing whose pitch circle diameter $D_p$ is 23 mm, a black triangular mark expresses the maximum value thereof, and a black square mark expresses the minimum value thereof, respectively.

As can be seen clearly from FIG. 7 which shows the results of the above test, in case where the pitch circle diameter $D_p$ is reduced, even when the ANDELON value is worsened, there can be prevented an increase in the value of the motor noise that is produced when the ball bearing is actually incorporated into the motor. The reason for this is believed that, in case where the pitch circle diameter $D_p$ is reduced, instead of reducing the diameter $D_b$ of the balls to thereby increase the number of the balls, the diameter $D_b$ of the balls can be reduced and, therefore, of the vibration components of the balls, the number of resonance peaks included in the resonance frequency range with respect to the motor is reduced, which operates to advantage in sound. This means that, for the purpose of reducing the motor noise, it is not necessary to reduce the ANDELON value so much. In other words, without carrying out a severe quality control for the purpose of reducing the ANDELON value specially, the motor noise can be reduced. Therefore, reduction in the motor noise can be realized without specially increasing the cost of the ball bearing.

Figure 8:
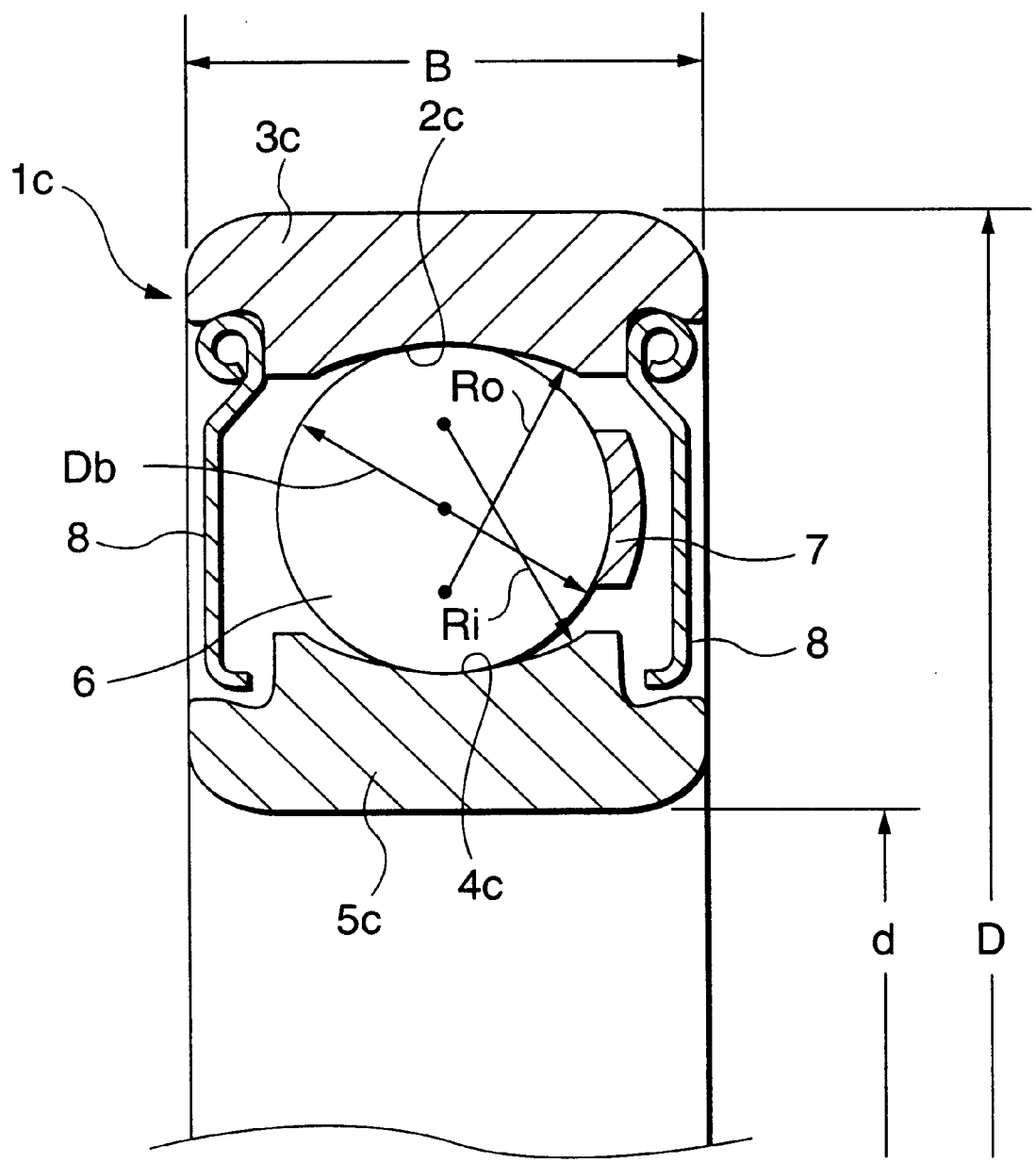
FIG. 8 is a partail section view of a third example of a mode for carrying out the invention.

Now, FIG. 8 shows a third example of a mode for carrying out the invention. According to the present mode, a ball bearing 1a, similarly to the conventionally known ball bearing 1 that is shown in the above-mentioned FIG. 5, comprises an outer ring 3c including on the inner peripheral surface thereof a deep-groove type of outer ring raceway 2c having an arc-shaped section, an inner ring 5c including on the outer peripheral surface thereof an inner ring raceway 4c having an arc-shaped section, and a plurality of balls 6 respectively interposed between the outer and inner ring raceways 2c and 4c so as to be free to roll. These balls 6 are respectively held by a retainer 7 in such a manner that they are able to roll while they are spaced from one another. Also, to the inner peripheral surfaces of the two end portions of the outer ring 3c, there are secured the outer peripheral edge portions of sealed rings 8 and 8, while the inner peripheral edge portions of the sealed rings 8 and 8 are respectively disposed so as to be close to but opposed to the outer peripheral surfaces of the two end portions of the inner ring 5c.

Especially, in the case of the ball bearing 1c according to the invention, where the diameter of the respective balls 6 is expressed as Db, the radius of curvature of the section shape of the outer ring raceway 2c is expressed as Ro, and the radius of curvature of the section shape of the inner ring raceway 4c is expressed as Ri, the following equations (1) and (2) can be satisfied: that is, $$0.58 \leq Ro/Db \leq 0.61 \quad (1)$$

$$0.52 \leq Ri/Db \leq 0.61 \quad (2)$$

In case where the above-structured ball bearing 1a is used to support the rotary shaft of a fan motor for a suction device employed in an electric cleaner, the outer ring 3c is inserted into and fixed to a fixed housing, while the inner ring 5c is outserted and fixed to the rotary shaft. By the way, the ball bearing 1c according to the invention is a ball bearing which not only is used to support the rotary shaft of a blower of a domestic-use electric cleaner but also is used under the low-load and high-speed rotation condition. Referring more specifically to the size of the ball bearing 1c, the outside diameter D of the outer ring 3c is of the order of 15–40 mm, the inside diameter d of the inner ring 5c is of the order of 6–18 mm, and the width B of the ball bearing 1c is of the order of 5–12 mm.

In the case of the above-structured ball bearing 1c according to the invention, not only sufficient durability can be secured but also, without reducing the outside diameter of the outer ring specially, sufficient rotation torque reduction can be realized. That is, by satisfying the above equations (1) and (2), contact ellipses, which are formed in the contact portions between the rolling surfaces of the balls 6 and the outer ring and inner ring raceways 2c, 4c, can be reduced in size so that rolling resistance and spin, which are caused in the contact ellipse portions during rotation, can be reduced to thereby be able to reduce the rotation torque of the ball bearing 1c.

Now, description will be given below of the results of a test conducted in order to confirm the effects of the second aspect of the invention. The test was conducted using a deep-groove type of ball bearing in which the outside diameter D of an outer ring 3c is 22 mm, the inside diameter d of an inner ring 5c is 8 mm, and the width of the ball bearing is 7 mm. As will be described below, there. were prepared two kinds of embodiments falling within the technical scope of the invention and two kinds of comparison examples not falling within the technical scope of the invention, that is, a total of four kinds of samples. The outer ring 3c, inner ring 5c and balls 6 are all made of steel SUJ2.

Embodiment 1

$Ro/Db=0.58$ $Ri/Db=0.58$

Embodiment 2

$Ro/Db=0.61$ $Ri/Db=0.61$

COMPARISON EXAMPLE 1

$Ro/Db=0.56$ $Ri/Db=0.51$

COMPARISON EXAMPLE 2

Ro/Db=0.56

Ri/Db=0.56

Now, in the test, using the above-mentioned four kinds of samples, the influences of the radius of curvature Ro of the section shape of the outer ring raceway 2c and the radius of curvature Ri of the section shape of the inner ring raceway 4c on the rotation torque of the ball bearing were confirmed by the test apparatus 9 as shown in FIGS. 4(A) and 4(B). The test apparatus 9 comprises a rotary shaft 10 and a housing 11 which are disposed concentric with each other. In measuring the rotation torque of the ball bearing, between the outer peripheral surface of the rotary shaft 10 and the inner peripheral surface of the housing 11, there were assembled ball bearings 1c, 1c having the same specifications, the rotary shaft 10 was rotated, and the torque, which was applied to the leading end portion of an arm 12 fixed to the outer peripheral surface of the housing 11, was measured by a load sensor 13. By the way, in all of the samples, grease for lubrication was charged into the ball bearings 1c, 1c, the two end portions of the ball bearings 1c, 1c were sealed by sealed rings 8, 8 each of a non-contact type (see FIG. 8). Also, the test apparatus was operated at room temperature in the air. Further, a preload of 49 N (5 kgf) was applied to the ball bearings 1c, 1c by a spring 14. The rotation speed of the rotary shaft 10 was varied in the range of 40,000–60,000 $min^{-1}$ and the rotation torque of the ball bearing after the passage of ten minutes from the start of the operation of the test apparatus was measured for every rotation speed.

Figure 9:
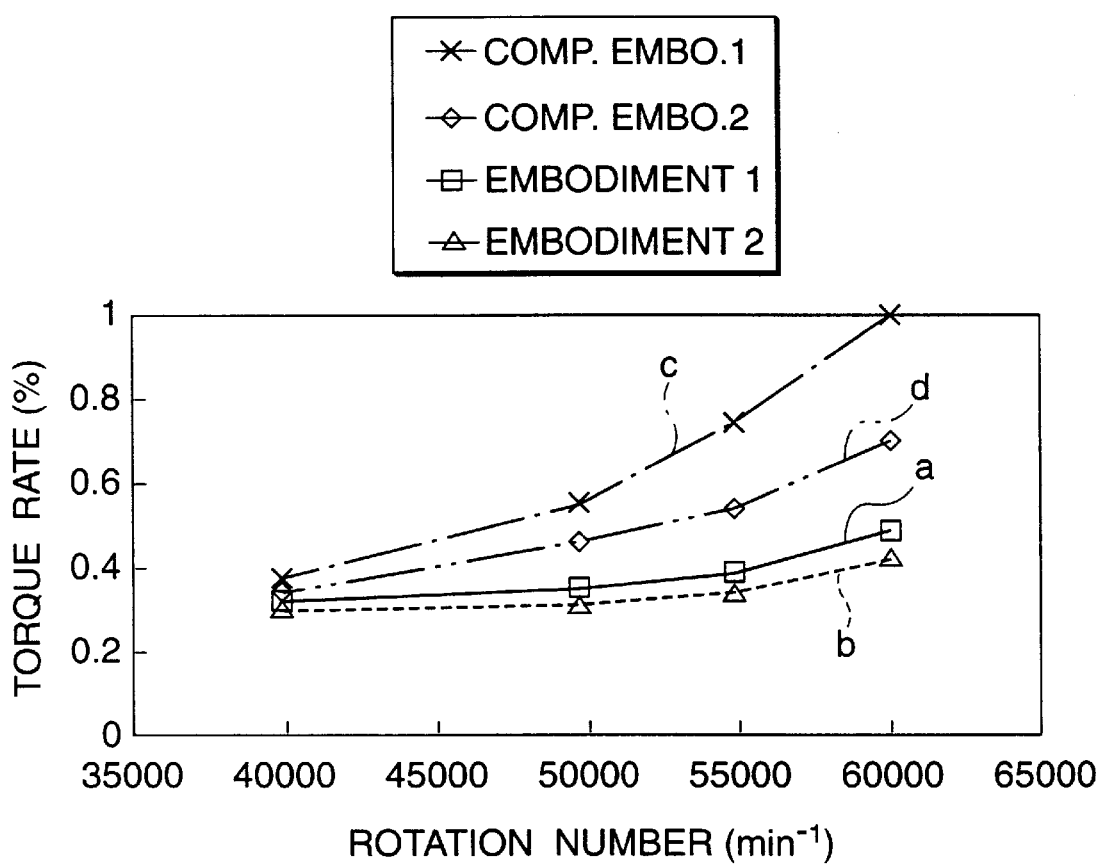
FIG. 9 is a graphical representation of the results of a test conducted to confirm the effects of the invention.
Figure 10:
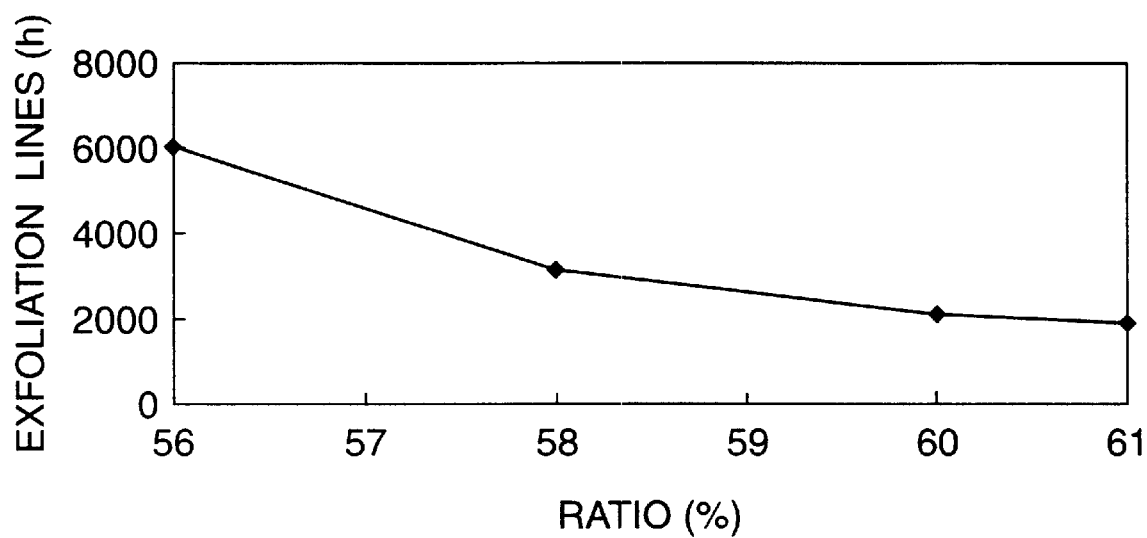
FIG. 10 is a graphical representation of the influences of the ratios of the radiuses of curvature of outer and inner ring raceways to the ball diameter on the exfoliation lives of the outer and inner ring raceways.

The results of the test conducted in this manner were shown in FIG. 9. In FIG. 9, a solid line a shows the test results of the embodiment 1, a broken line b shows the test results of the embodiment 2, a one-dot chained line c shows the test results of the comparison example 1, and a two-dot chained line d shows the test results of the comparison example 2, respectively. As can be seen clearly from FIG. 9, by reducing the values of the ratios of the radiuses of curvature Ro, Ri of the respective raceways to the ball diameter Db, the rotation torque of the ball bearing can be reduced.

Since a ball bearing according to the first aspect of the invention is structured and operates in the above-mentioned manner, the present ball bearing can reduce the rotation resistance or rotation torque of the rotation support portions of various machines and apparatus, thereby being able to save energy when operating such machines and apparatus.

In addition, since a ball bearing for an electric cleaner according to the second aspect of the invention is structured and operates in the above-mentioned manner, the present ball bearing not only can secure practically sufficient durability but also can reduce the rotation resistance or rotation torque of the rotation support portion of the electric cleaner, thereby being able to save energy when operating such electric cleaner.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A ball bearing comprising:

an outer ring including on the inner peripheral surface thereof an outer ring raceway having an arc-shaped section;

an inner ring including on the outer peripheral surface thereof an inner ring raceway having an arc-shaped section; and a plurality of balls respectively interposed rollably between said outer and inner ring raceways, wherein, where the outside diameter of said outer ring is expressed as D, the inside diameter of said inner ring is expressed as d, the pitch circle diameter of said respective balls is expressed as Dp, the following equations (1), (2), (3) and (4) can be satisfied:

$$x=Db/\{(D-d)/2\}, \quad (1)$$

$$y=Dp/\{(D+d)/2\}, \quad (2)$$

$$x \geq 0.3, \quad (3)$$

and $$y < 1.0, \quad (4)$$

and further wherein, where the diameter of said respective balls is expressed as Db, the radius of curvature of the section shape of said outer ring raceway is expressed as Ro, and the radius of curvature of the section shape of said inner ring raceway is expressed as Ri, the following equations (5) and (6) can be satisfied:

$$0.53 < Ro/Db \leq 0.65, \quad (5)$$

and $$0.52 < Ri/Db \leq 0.65, \quad (6)$$

and further wherein the diameter of an inner ring raceway whose maximum circumferential stress provides 294 MPa (30 kgf/mm$^2$) under the condition that, in case where d is in the range 6–10 mm, the interference of said inner ring is 11 $\mu$m and in case where d is in the range of more than 10 mm up to 18 mm, the interference of said inner ring is 12 $\mu$m, is expressed as Di, the following equation (7) can be satisfied:

$$y \geq \{(D-d)/(D+d)\}x+2Di/(D+d) \quad (7).$$

2. A ball bearing comprising:

an outer ring including on the inner peripheral surface thereof an outer ring raceway having an arc-shaped section;

an inner ring including on the outer peripheral surface thereof an inner ring raceway having an arc-shaped section; and a plurality of balls respectively interposed rollably between said outer and inner ring raceways, wherein, where the outside diameter of said outer ring is expressed as D, the inside diameter of said inner ring is expressed as d, the pitch circle diameter of said respective balls is expressed as Dp, the following equations (1), (2), (3) and (4) can be satisfied:

$$x=Db/\{(D-d)/2\}, \quad (1)$$

$$y=Dp/\{(D+d)/2\}, \quad (2)$$

$$x \geq 0.3, \quad (3)$$

and $$y<1.0, \tag{4}$$

and further wherein, in case wherein the inside diameter d of said inner ring is less than 6 mm, under the condition that the interference of said inner ring is expressed by a curved line allowing the following three points, which are plotted in perpendicular coordinates in which the inner ring inside diameter d is shown in one of the vertical and horizontal axes thereof and the inner ring interference is shown in the other, to be smoothly continuous with one another, a first point where said inner ring interference is 6 μm for said inner ring inside diameter of 5 mm, a second point where said inner ring interference is 2 μm for said inner ring inside diameter of 4 mm, and a third point wherein said inner ring interference is 1 μm for said inner ring inside diameter of 3 mm, when the diameter of an inner ring raceway providing the maximum circumferential stress of 294 MPa (30 kgf/mm$^2$) is expressed as $D_i$, the following equation (8) can be satisfied:

$$y \geq \{(D-d)/(D+d)\}x + 2Di/(D+d) \tag{8}$$

3. A ball bearing for use in an electric cleaner, said ball bearing comprising:

an outer ring including on the inner peripheral surface thereof an outer ring raceway having an arc-shaped section;

an inner ring including on the outer peripheral surface thereof an inner ring raceway having an arc-shaped section; and, a plurality of balls respectively interposed rollably between said outer and inner ring raceways, said ball bearing being incorporated into the rotation support portion of said electric cleaner and used in such a manner that said outer ring is fixed and said inner ring are rotated at the speed of 40,000–60,000 min$^{-1}$, wherein, where the diameter of said respective balls is expressed as Db, the radius of curvature of the section shape of said outer ring raceway is expressed as Ro, and the radius of curvature of the section shape of said inner ring raceway is expressed as Ri, the following equations (1) and (2) can be satisfied:

$$0.58 \leq Ro/Db \leq 0.61; \tag{1}$$

and $$0.58 \leq Ri/Db \leq 0.61 \tag{2}$$

4. The ball bearing according to claim 3, wherein said outer ring, said inner ring and said balls are made of bearing steel.

* * * * *